O. L. IHRIG.
MEANS FOR SUPPLYING AIR AND WATER TO CARBURETERS.
APPLICATION FILED JULY 16, 1914.

1,170,069.

Patented Feb. 1, 1916.
2 SHEETS—SHEET 1.

Witnesses:

Inventor:
Orland L. Ihrig.

by Parker Carter
his Attys.

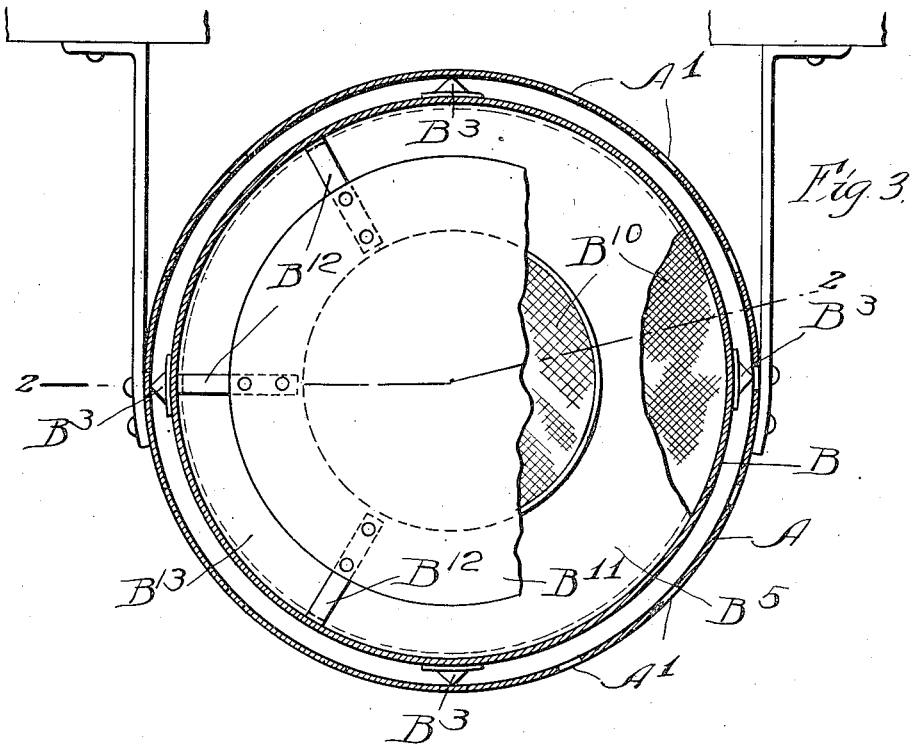
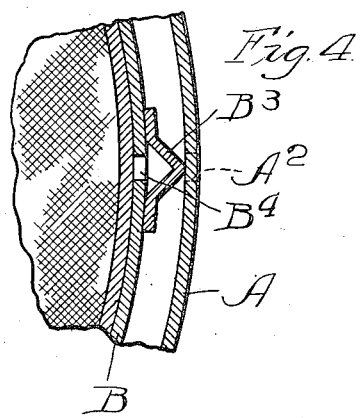
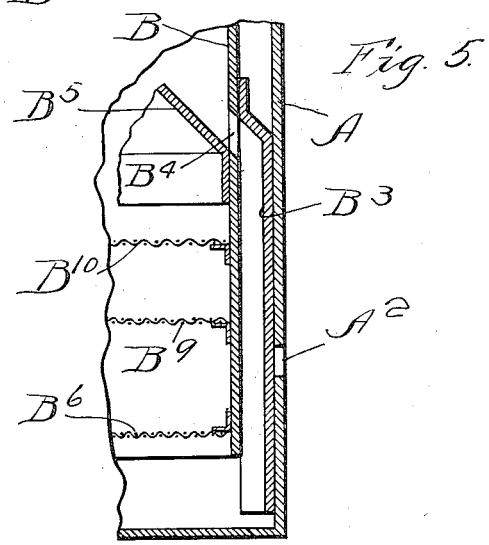

UNITED STATES PATENT OFFICE.

ORLAND L. IHRIG, OF SUNNYVALE, CALIFORNIA, ASSIGNOR TO M. RUMELY COMPANY, OF LAPORTE, INDIANA, A CORPORATION OF INDIANA.

MEANS FOR SUPPLYING AIR AND WATER TO CARBURETERS.

1,170,069.  Specification of Letters Patent.  Patented Feb. 1, 1916.

Application filed July 16, 1914. Serial No. 851,307.

*To all whom it may concern:*

Be it known that I, ORLAND L. IHRIG, a citizen of the United States, residing at Sunnyvale, in the county of Santa Clara and State of California, have invented a certain new and useful Improvement in Means for Supplying Air and Water to Carbureters, of which the following is a specification.

My invention relates to improvements in air and water supplying means for carbureters for combustion engines and the like.

Among its objects are to provide means for cleaning or washing the air which is subsequently to be conveyed to a carbureter for a combustion motor and also to supply moisture to this air and water to the carbureter to promote satisfactory combustion of the heavier fuel oils and the like.

It is illustrated diagrammatically in one form in the accompanying drawings, wherein—

Figure 1:
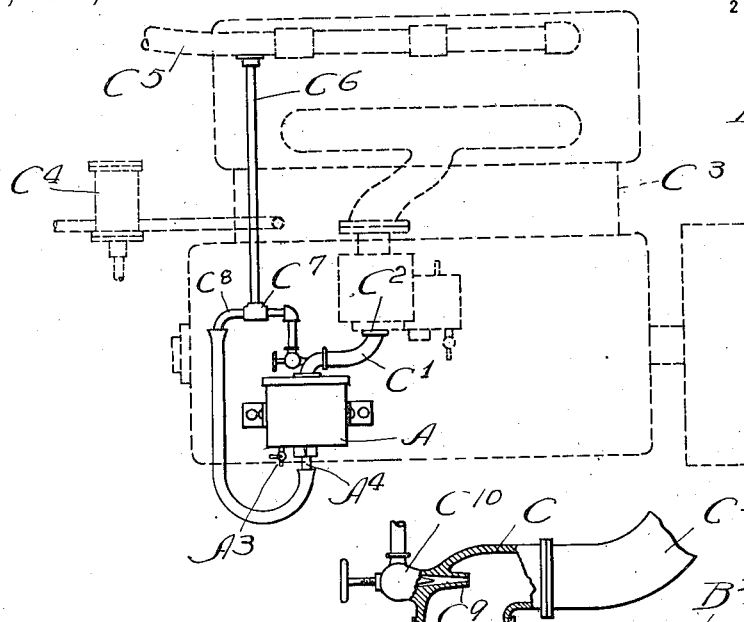
Figure 2:
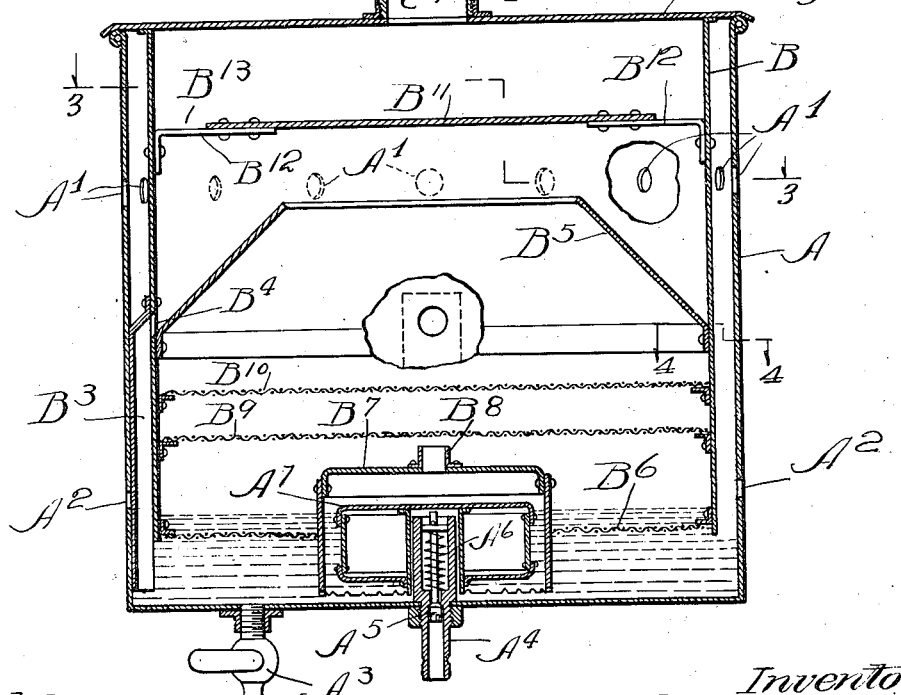

Figure 1 is a diagrammatic view of an engine and carbureter with my device attached; Fig. 2 is a vertical section through my device; Fig. 3 is a section along line 3—3 of Fig. 2; and Fig. 4 is a section along line 4—4 of Fig. 2. Fig. 5 is a detail section through the side wall of my device adjacent the bottom thereof.

Like parts are indicated by like letters throughout the several figures.

A is a cylinder housing or tank closed at the bottom and open at the top.

$A^1$, $A^1$ are air intake apertures in the wall of the tank A.

$A^2$, $A^2$ are small overflow apertures slightly above the normal liquid level.

$A^3$ is a clean-out valve at the bottom of the tank.

$A^4$ is a filler pipe controlled by a plug valve $A^5$ held normally closed by a spring $A^6$ adapted to be opened by the weight of the float $A^7$ when the liquid level drops below the predetermined level.

B is a cylinder having a closed top $B^1$ flanged as indicated to rest upon and be supported by the upper edge of the outer tank A. The cylinder B is of such height that when supported by this flange in the cylinder A as indicated the lower edge remains above the bottom of the cylinder A.

$B^3$ are spacers arranged about the periphery of the cylinder B along its lower edge adapted to engage the cylinder edge to center the cylinder B in the cylinder A. These spacers which are hollow triangular members, as indicated, extend down below the bottom of the cylinder B immediately above the bottom of the cylinder A and they communicate with the interior of the cylinder B through the apertures $B^4$.

$B^5$ is a conical baffle plate mounted in the cylinder B and terminating in line with the apertures $B^4$ so that liquid which finds its way to the outer or upper side of the baffle plate will run off to the bottom of the cylinder or tank A.

$B^6$ is a screen located at the bottom of the cylinder A. Centrally disposed in said cylinder and together with the screen partially closed at the bottom thereof is a housing $B^7$ which incases the plug feed mechanism as indicated and is provided with a vent pipe $B^8$.

$B^9$, $B^{10}$ are screens extending across the cylinder B separated one from the other and located above the normal liquid level which has the screen $B^6$ located below the normal liquid level.

$B^{11}$ is a horizontal baffle plate located above the conical baffle plate $B^5$ spaced from and supported upon and by the bracket $B^{12}$ to form the annular passage $B^{13}$ between the plate and walls.

C is a discharge elbow or pocket leading from the top of the cylinder B and communicating by means of a flexible connection $C^1$ with a carbureter air intake pipe $C^2$ on a combustion motor $C^3$.

$C^4$ is a circulating water pump on the combustion motor $C^3$ which supplies cooling water thereto in the usual manner.

$C^6$ is a pipe leading from the cooling system pipe $C^5$ to one branch of a T $C^7$.

$C^8$ is a pipe leading from the other branch in the T to supply water to the filler pipe $A^4$.

$C^9$ is a water supply nozzle discharging from the remaining branch of the T into the interior of the elbow C. It is controlled by a needle valve $C^{10}$.

It will be evident that while I have shown in my drawings an operative device still many changes might be made both in size, shape and arrangement of parts without departing materially from the spirit of my invention, and I wish, therefore, that my drawings be regarded as in a sense diagrammatic.

The use and operation of my invention are as follows: My device is prepared for use by first inserting the upper or inner cylinder into the outer cylinder, connecting the discharge mouth or elbow in the cylinder to the engine carbureter by any suitable preferably flexible connection. The engine circulating system is then connected up to one branch of the T in the elbow and the pipe is also led from the other branch of the T to the supply pipe at the bottom of the outside cylinder. Water is allowed to flow into the bottom of the cylinder, the needle valve being meanwhile closed until the water level reaches the predetermined point when the float will be raised and the spring will be able to close the plug valve. At this point or level the lower screen carried adjacent the bottom edge of the cylinder will be immersed and the inside of the inner cylinder thus forms what is in effect a vacuum chamber open to the carbureter through the discharge elbow but closed to the outer cylinder by the water. The engine is then started. As it operates it draws air from the inner cylinder producing therein a vacuum. Air meanwhile rushes down from the openings in the wall of the outer cylinder and is drawn into the water supply bubbling up through the screen, which thus assists in breaking up and mixing the air and water so that the air is effectually washed and all dust and dirt in the air is left with the water and the air passes up, through the two upper screens which are kept thoroughly moist by the bubbling up of the water carrying with it a certain amount of water in suspension. This water is taken out of the air by the two baffle plates. This air passes in a thoroughly washed but moist condition out from the bottom of the chamber into the conduit which conducts it to the carbureter. Experience shows that even this moist air does not carry enough water and it is desirable to supply additional water, the supply of which is controlled by the needle valve. The amount of moisture carried by the air can be controlled but this does not interfere with the liquid level in the bottom of the tank and this water, moreover, as it does not come from the tank is clear and pure and not mixed with any dust or dirt from the air. The level of the water is, of course, kept constant by the float feed mechanism shown but in case it should happen that the engine should be stopped with the needle valve open the tank would fill up were it not for the openings in the bottom which are sufficient to carry off any excess flow of water so that there is no danger of the device filling up with water and thus becoming inoperative. My device may be cleaned by withdrawing the inner from the outer cylinder and draining the water from the drain at the bottom.

I claim:

1. An air washer comprising a receptacle adapted to contain a quantity of liquid, an air inlet passage opening below the surface of said liquid, an air outlet passage arranged at the top of said receptacle, an inverted funnel contacting at its lower end with the sides of the receptacle, and a baffle plate of less diameter than the receptacle arranged above said inverted funnel, and a conduit extending from the annular space between the funnel and the receptacle to a point below the surface of the said liquid.

2. An air washer comprising a cylindrical housing closed at the bottom, a casing closed at the top and open at the bottom suspended within said housing its bottom being lifted above the bottom of the housing and upwardly, an extended truncated flange mounted within the casing and open at the top, a baffle plate above the open top of the cone located within the housing and extending outwardly beyond the open mouth of the cone, a discharge pipe leading from the casing above the baffle plate.

3. An air washer comprising a cylindrical housing closed at the bottom, a casing closed at the top and open at the bottom suspended within said housing its bottom being lifted above the bottom of the housing and upwardly, an extended truncated flange mounted within the casing and open at the top, a baffle plate above the open top of the cone located within the housing and extending outwardly beyond the open mouth of the cone, a discharge pipe leading from the casing above the baffle plate, the wall of the casing being apertured above the cone, a discharge pipe located upon the outside wall of the housing communicating with said aperture and discharging downwardly beneath the lower edge of the housing.

In testimony whereof, I affix my signature in the presence of two witnesses this 7th day of July, 1914.

ORLAND L. IHRIG.

Witnesses:
LAUREL M. DOREMUS,
GENEVA HIRTH.